United States Patent
Khan et al.

(10) Patent No.: US 10,596,988 B2
(45) Date of Patent: Mar. 24, 2020

(54) HYBRID BUMPER BEAM FOR A VEHICLE AND METHOD FOR MANUFACTURING THE SAME

(71) Applicant: AISIN TECHNICAL CENTER OF AMERICA, INC., Northville, MI (US)

(72) Inventors: Saida Khan, Canton, MI (US); Santosh Sarang, Novi, MI (US); Ichiro Hiratsuka, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 66 days.

(21) Appl. No.: 15/475,964

(22) Filed: Mar. 31, 2017

(65) Prior Publication Data

US 2018/0281711 A1 Oct. 4, 2018

(51) Int. Cl.
*B60R 19/18* (2006.01)
*B60R 19/03* (2006.01)

(52) U.S. Cl.
CPC .............. *B60R 19/18* (2013.01); *B60R 19/03* (2013.01); *B60R 2019/1806* (2013.01)

(58) Field of Classification Search
CPC . B60R 19/18; B60R 19/03; B60R 2019/1853; B60R 19/34; B60R 2019/186; B60R 19/24; B60R 19/023
USPC ....... 293/120, 133, 132, 117, 122, 155, 115, 293/121, 154; 296/187.02, 187.03, 296/190.03, 191, 203.01; 264/257, 149, 264/241, 242, 248, 255, 258, 261, 279
See application file for complete search history.

(56) References Cited

U.S. PATENT DOCUMENTS

| | | | | |
|---|---|---|---|---|
| 8,469,415 B2* | 6/2013 | Haneda | ................... | B60R 19/18 293/102 |
| 2007/0120383 A1* | 5/2007 | Schmidt | ................... | B60R 19/18 293/102 |
| 2013/0175813 A1* | 7/2013 | Mana | ...................... | B60R 19/18 293/120 |
| 2014/0339224 A1* | 11/2014 | Wiater | ................... | B29C 65/04 219/765 |
| 2015/0015005 A1* | 1/2015 | Shin | ........................ | B60R 19/18 293/120 |
| 2015/0307044 A1* | 10/2015 | Hundley | ................. | B60R 19/18 293/120 |
| 2016/0144812 A1 | 5/2016 | Kaneko et al. | | |

FOREIGN PATENT DOCUMENTS

| | | |
|---|---|---|
| JP | 11-173358 A | 6/1999 |
| JP | 2014-218179 A | 11/2014 |
| JP | 2016-97795 A | 5/2016 |

OTHER PUBLICATIONS

Japanese Office Action dated Mar. 5, 2019 in Patent Application No. 2018-066849 (with English translation), 22 pages.

* cited by examiner

*Primary Examiner* — D Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A bumper beam for a vehicle including a bumper beam body having a tubular portion extending in a vehicle width direction, the bumper beam having a metal section and a composite section, wherein the metal section and the composite section are coaxial, the composite portion being along an inner surface of the metal section.

10 Claims, 6 Drawing Sheets

HYBRID BUMPER BEAM FOR A VEHICLE AND METHOD FOR MANUFACTURING THE SAME

TECHNICAL FIELD

This disclosure relates generally to a bumper beam and process of making the bumper beam for automotive application. More particularly the present disclosure related to a plastic composite reinforced metal hybrid bumper beam for a vehicle.

BACKGROUND

A bumper assembly for a vehicle is mounted on the front and rear ends of a vehicle body, respectively, to absorb impact in the event of a collision, thus protecting a driver and passengers during an accident and preventing deformation of the vehicle body. The bumper assembly generally includes a bumper cover, an energy absorber, and a bumper beam.

In the bumper beam described in Japanese Patent Application 2014-218179, the cavity of the bumper beam is filled with high density structural foam. Thus, the weight of the bumper beam is significantly increased without a significant increase in strength. In addition, a reinforcing member has no direct attachment to the metal members which is susceptible to slide. Thus, the reinforcing member provides no/slight benefit while adding the cost.

In the bumper beam described in U.S. Patent Application Publication 2016/0144812 A1, the outer metal section is a two part section that requires some joining mechanism. In the event of a crash, the joining mechanism is susceptible to failure. In addition, the inner molded composite part need a separate joining with the metal parts to be able to effectively transfer load in an event of a crash which introduces more process steps and complexity in the manufacturing process.

Accordingly, what is needed, as recognized by the present inventors, is a bumper beam that increases safety without increasing the weight.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a bumper beam for a vehicle. The bumper beam includes a bumper beam body having a tubular portion extending in a vehicle width direction, the bumper beam having a metal section and a composite section, wherein the metal section and the composite section are coaxial, the composite portion being along an inner surface of the metal section.

According to an embodiment of the present disclosure, there is provided a method for manufacturing a bumper beam for a vehicle. The method includes manufacturing a metal profile of a predetermined shape corresponding to a metal section of the bumper beam; wrapping a hollow preform of a resin impregnated fiber around an inflatable mandrel; inserting the wrapped inflatable mandrel into the metal profile; heating the wrapped inflatable and the metal profile so the resin bonds to the metal profile; and inflating the inflatable mandrel so that the hollow preform is pressed against the inner side of the metal profile.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
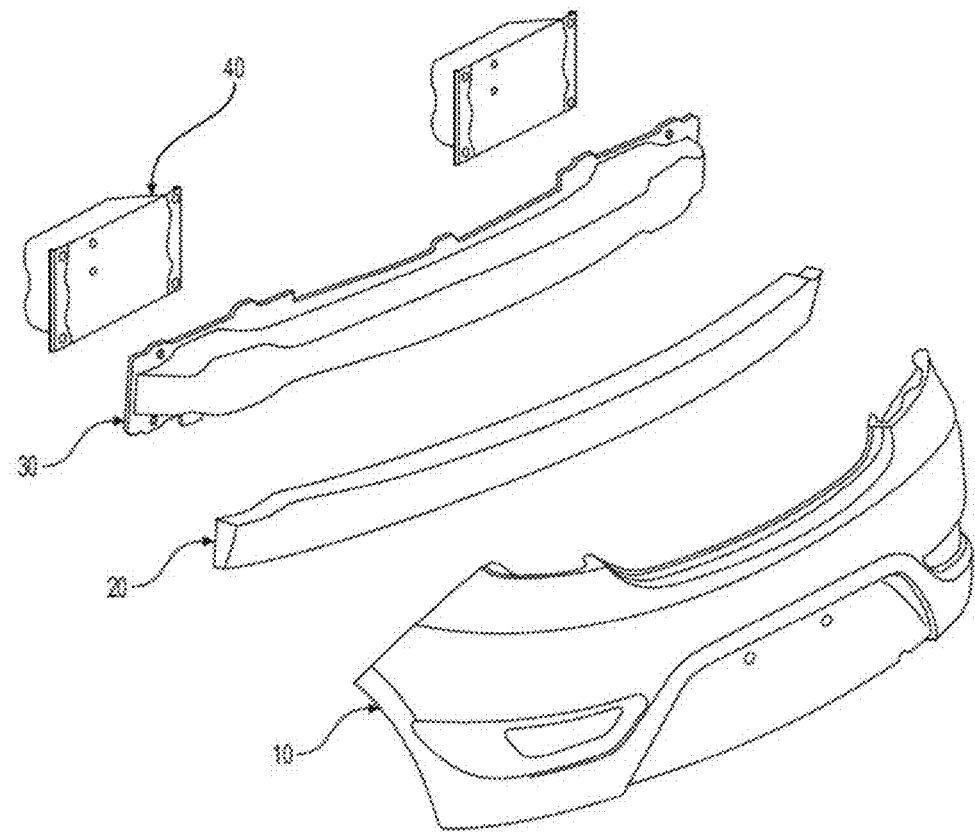
FIG. 1 is a perspective view showing the configuration of a typical bumper assembly for a vehicle.

Referring now to the drawings, wherein like reference numerals designate identical or corresponding parts throughout several views, the following description relates to a bumper beam and a process of manufacturing of the bumper beam for a vehicle.

It is to be understood that terms such as "left," "right," "front," "rear," "side," "height," "length," "width," "upper," "lower," "inner," "outer," and the like that may be used herein merely describe points of reference and do not necessarily limit embodiments of the present disclosure to any particular orientation or configuration. Furthermore, terms such us "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10%, or preferably 5% in certain embodiments, and any values therebetween.

The term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electrical vehicles, hydrogen-powered vehicles and other alternative fuel vehicles, and driverless automobiles.

FIG. 1 is a perspective view showing the configuration of a typical bumper assembly for a vehicle. The vehicle bumper assembly may include a bumper cover 10 for covering or enclosing an entire bottom area of the front or rear end of a vehicle body, an energy absorber 20 for absorbing vibrations and impact energy translated of the bumper cover 10, a bumper beam (or a back beam) 30 located at the rear of the energy absorber 20 to protect the vehicle body from damage upon impact, and a stay 40 for fixing and supporting the bumper beam 30 to the vehicle body. The bumper beam 30 may be used in a bumper assembly mounted to a front end portion of the vehicle or a rear end portion of the vehicle.

In one embodiment, the bumper assembly may be composed of only the bumper cover 10, the bumper beam 30, and the stay 40, for example, in a compact vehicle. The bumper beam 30 is configured to efficiently absorb the impact energy.

Figure 2A:
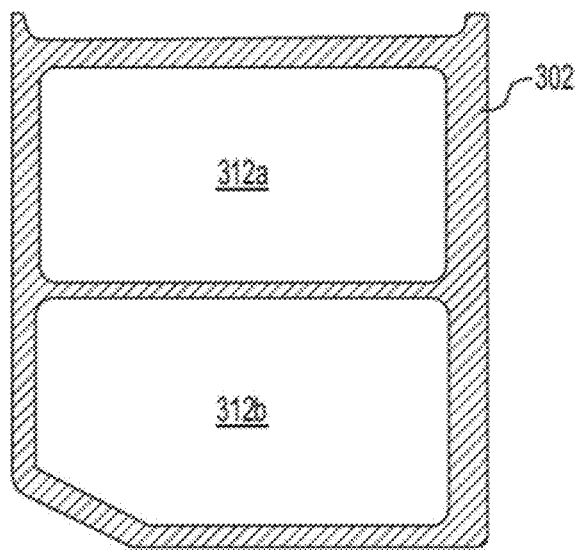
FIGS. 2A-C show cross section views of a bumper beam.
Figure 2C:
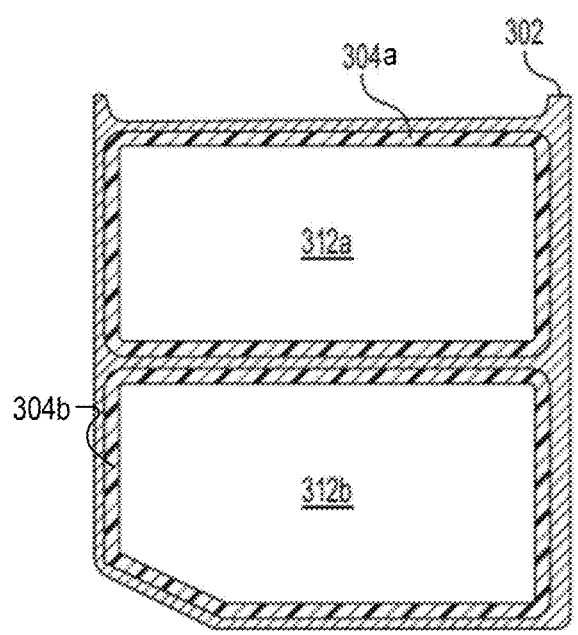
Figure 2B:
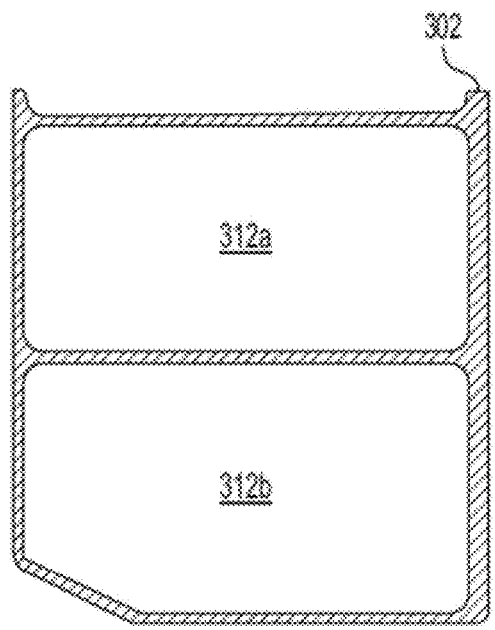

FIGS. 2A-C show cross section views of bumper beams. The bumper beam 30 may include a closed metal section having a cross section shape as shown in FIGS. 2A-C. A typical bumper beam is extruded aluminum up to 6.2 mm thick section as shown in FIG. 2A. Introduction of newer and more rigorous testing requirements may force increasing the bumper thickness and thereby increasing the weight of the bumper beam 30, and therefore the bumper assembly. The bumper beam 30 described herein is a hybrid of metal and fiber reinforced composite with a thinner cross section of metal. For example, the metal section may be down to 3.5 mm as shown in FIG. 2B. Since composite is lighter than aluminum, reinforcing with composite materials provides the required performance at reduced weight. The hybrid assembly of aluminum and composite is shown in FIG. 2C.

The bumper beam 30 includes a metal section 302 and one or more composite sections 304, referred to herein as the composite section 304 (e.g., 304a and 304b as shown in FIG. 2C). The metal section 302 is formed into a tubular shape (i.e., hollow shape) extending in the vehicle width direction. The metal section 302 and the composite section 304 are coaxial with the composite section 304 being inside the metal section 302. Further, the metal section 302 may include one or more hollow cavities, for example, as shown by 312a and 312b in FIGS. 2A-C.

The composite section 304 is placed inside the metal section 302 to prevent galvanic corrosion due to water and moisture exposure. In addition, placing the composite section 304 inside of the metal section 302 prevents scattering debris from a shattered composite section in case of a collision or crash.

The metal section 302 is made of metal, for example, aluminum. The material for the composite section 304 may be a fiber reinforced composite. The composite section 304 may be comprised of continuous carbon, glass, aramid, or combination of fibers impregnated with resin being any thermoplastic material such as nylon 6 (PA6), polypropylene (PP), polymethylpentene (PMP), polybutylene terephthalate (PBT), polyethylene terephthalate (PET), thermoplastic elastomer (TPE), or thermoset resin such as epoxy, urethane, acrylic and the like.

A contour of the cross section of the metal section 302 has a substantially rectangular shape when taken along a direction perpendicular to a longitudinal direction of the metal section 302 (i.e., vehicle width direction) as shown in FIG. 2C. Other shapes may be also implemented based on the design and safety requirements of the vehicle.

The aluminum grade/thickness of the metal section 302 can be variable. The composite section 304 (e.g., 304a, 304b) thickness, shape, and length in a vehicle width direction may be variable. The composite section 304 may partially or fully reinforce the metal section 302.

Next, a procedure of manufacturing the bumper beam 30 is described.

Figure 3:
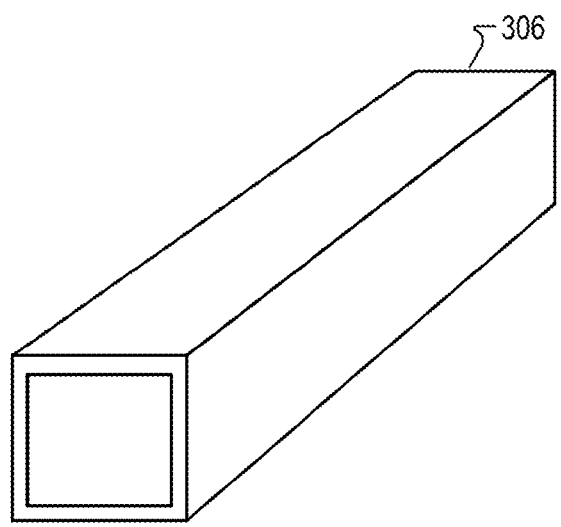
FIG. 3 is a schematic that shows a closed hollow preform according to one example.

Metal profiles (e.g., aluminum profile) may be manufactured by extrusion. A cross section view of an aluminum profile is shown in FIG. 2B. The composite section 304 is made as a tubular, hat or c shaped flexible hollow preform 306 by weaving, braiding, or by automatic fiber placement (AFT), 3D printing, or pultrusion of resin impregnated fiber tows as shown in FIG. 3. The preforming material for composite section 304 may also include prepreg, comingled fiber, unidirectional (UD) tapes, organo-sheet, fabric and any other form of resin impregnated continuous fiber material.

Figure 4:
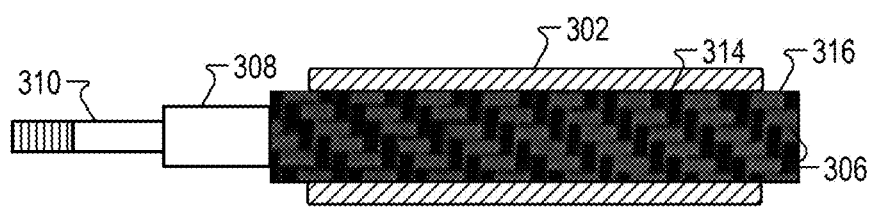
FIG. 4 is a schematic that shows a manufacturing step process according to one example.

The composite preform 306 may be wrapped around an inflatable mandrel 308 using several plies laid up into specific orientation to create the required thickness of the composite. The mandrel 308 wrapped with composite prepreg is inserted into the aluminum profile. Then, the entire assembly is heated by induction, conduction or convection method up to the point so the resin impregnates the fibers completely and bond to the metal. At the same time, the mandrel 308 may be inflated at room temperature or using heated gas (e.g., via gas inlet port 310), heated oil, or heated water as shown in FIG. 4 to press an outer surface 316 of the composite preform 306 against an inner surface 314 of the metal section 302 to conform to the shape of the metal section 302.

When the metal section 302 includes multiple cavities (e.g., 312a, 312b), the process described herein may be repeated with additional preforms associated with each of the cavities. Thus, the composite section 304 may be non-continuous.

Figure 6:
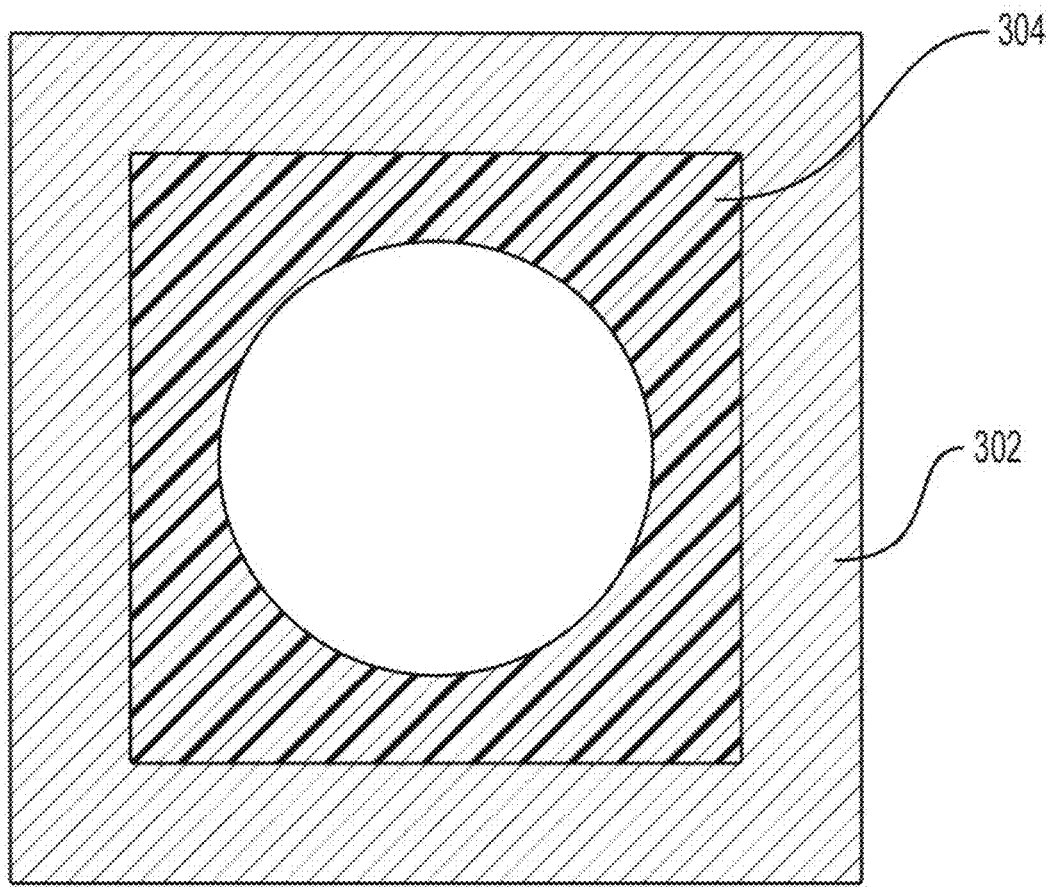
FIG. 6 shows a cross section of the bumper beam with reinforced corners.

The thickness of the composite section 304 may be changed locally. Additional layers of materials may be used to create a variable thickness at one or more portions of the bumper beam 30 to increase the strength of the one or more portions. For example, a center portion of the bumper beam 30 can be made thicker and stronger with more fiber reinforcement (i.e., more plies are laid up at the center portion of the bumper beam compared to end sections of the bumper beam) for center pole crash requirements. Similarly, inside corners may also be reinforced using more fibers in corners as shown in FIG. 6.

The shape of the metal section 302 may be irregular or corrugated based on the crash requirements. Using the process described herein, the composite section 304 confirms to the metal section 302 regardless of the shape of the metal section 302. Thus, the metal section 302 is used as a mold for simultaneous molding and bonding the composite reinforcement to the inner surface 314 of the metal section 302 to create the hybrid assembly. In addition, the process allows one step process of molding and bonding the composite section 304 inside the metal section 302 with minimum surface preparation.

It is possible to control the fiber angles by the above mentioned processes. It is important to utilize the fibers in proper angles since the impact performance depends on the angles. For example, the fibers can be placed at 0, 30, 45, 60, 90 degree or any other angle as a function of crash requirements. The fibers can be glass, carbon, aramid or a combination thereof. The fibers can be partially or completely impregnated with thermoplastic resin, thermoset resin, or can be comingled with thermoplastic resin.

In one embodiment, the resin can be modified to include additives such as maleic anhydride or fillers such as chopped fibers that can enhance bonding with metal and the interlaminar strength.

In one embodiment, the resin can be modified to include nanoparticles such as graphite or metal particles to facilitate uniform and rapid heating.

Figure 5:
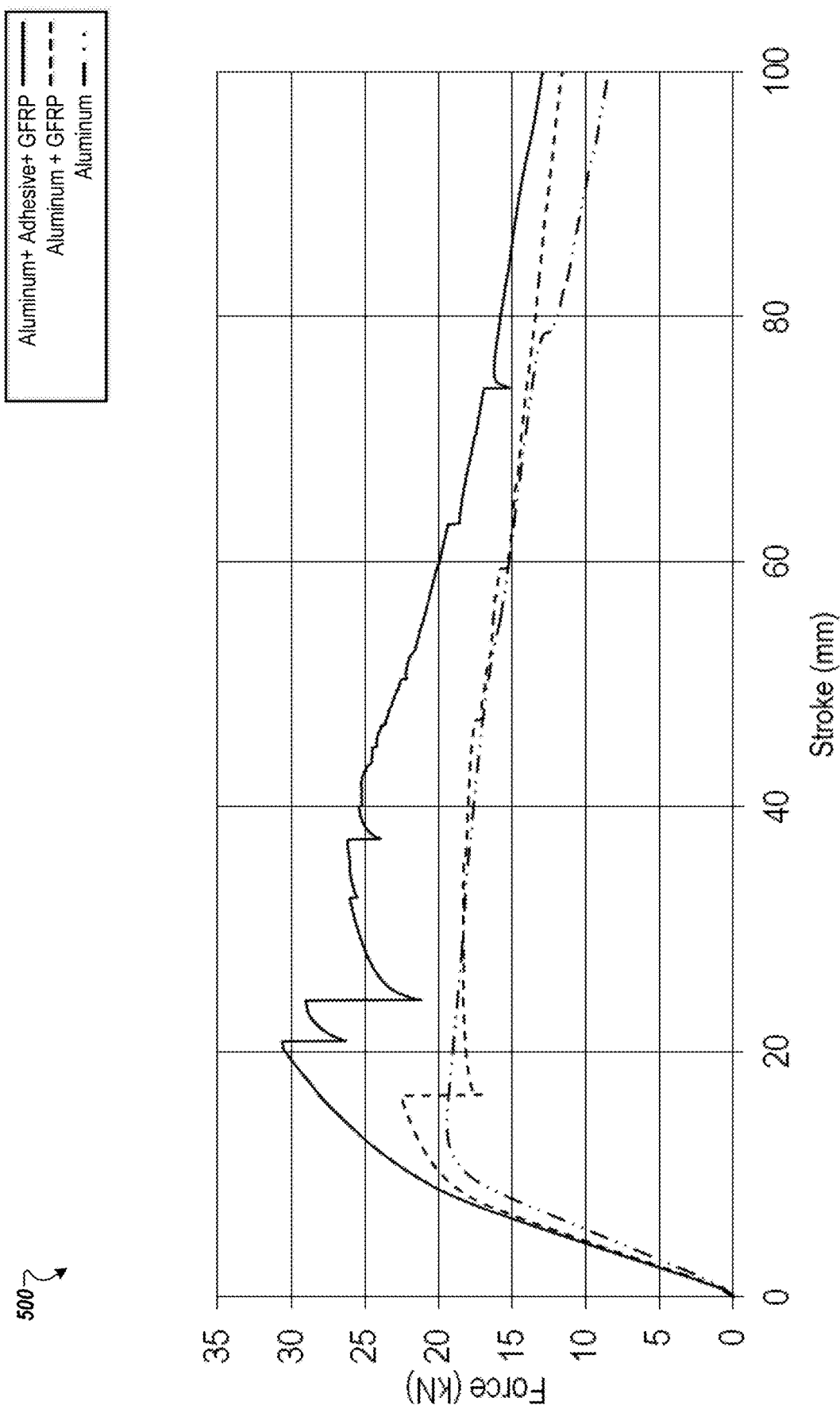
FIG. 5 is a schematic that shows exemplary testing results.

The inventors performed tests for comparing performance of the bumper beam described herein with an aluminum reference. An Aluminum 6061 tube is extruded to an appropriate test piece size. PA6 (Nylon 6) resin impregnated glass fiber roving (i.e., Glass fiber reinforced plastic (GFRP)) was used to create a closed tubular shape using a unidirectional automatic tow placement process. A film adhesive is used as the outer layer of the preform. Then, a silicone rubber mandrel was wrapped by the composite tube. The silicone rubber mandrel and the composite tube are inserted into the aluminum tube. The mandrel was connected to a nitrogen gas source and inflated to bring the outer radius surface of composite section in complete contact with the inner radius surface of metal part. The gas pressure used was only 200 psi. The entire assembly was heated up to 480 F to ensure the resin is melted and provided enough time for complete impregnation by the resin. The tubes were tested for three point flexural load and showed significant (up to 58%) improvement in peak load as shown in schematic 500 of FIG. 5. Table 1 below shows experimental results for the test samples.

TABLE 1

Experimental results for three test samples

| Type | Weight [g] | Gain mass | Force [kN] | Force improvement |
|---|---|---|---|---|
| Aluminum reference | 1500 | — | 19,411.75 | — |
| Al + 2 mm GFRP reinforcement | 1820 | 121.3% | 22,592.45 | 116.4% |
| Al + adhesive + 2 mm GFRP reinforcement | 1874 | 124.9% | 30,671.64 | 158.0% |

The bumper beam 30 described herein has improved mechanical properties and crash performance. Additionally, the bumper beam described herein and associated process of manufacturing allow auto manufactures to produce a bumper beam with a decreased weight, while at the same time having equivalent performance to heavier (aluminum) bumpers. The composite section is in substantially complete contact with the metal section which provides excellent load transfer. Further, the bumper beam allows for reduction in manufacturing costs associated with making the vehicle. The use of composite enables the bumper become lighter weight by reducing metal thickness, at the same time have excellent mechanical properties and crash performance. In addition, the manufacturing process is low cost and suitable for high volume manufacturing. The molding process requires very low investment and is suitable to adapt as a process step into existing metal forming manufacturing process. Further, the manufacturing process provides a net shape while minimizing materials waste.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The process of coaxial composite/metal beam can be also applied to other products such as roof bow, subframe, electrical vehicle (EV) battery enclosure, door impact beam, and the like. The disclosure, including any readily discernible variants of the teachings herein, defines, in part, the scope of the foregoing claim terminology such that no inventive subject matter is dedicated to the public.

The invention claimed is:

1. A method for manufacturing a bumper beam for a vehicle comprising:
   manufacturing a metal profile of a predetermined shape corresponding to a metal section of the bumper beam;
   wrapping a hollow preform of a resin impregnated fiber around an inflatable mandrel;
   inserting the wrapped inflatable mandrel into the metal profile;
   heating the wrapped inflatable mandrel and the metal profile so the resin bonds to the metal profile; and
   inflating the inflatable mandrel so that the hollow preform is pressed against an inner surface of the metal profile to form a composite section of the bumper beam.

2. The method of claim 1, wherein the resin impregnated fiber is selected from the group consisting continuous carbon fiber, glass fiber, aramid fiber or a combination of fibers.

3. The method of claim 1, further comprising:
   controlling an angle of the resin impregnated fiber by laying up one or several plies into a predetermined orientation.

4. The method of claim 1, further comprising:
   adding additives and fillers to the resin to improve interfacial adhesion and thermal properties.

5. The method of claim 1, wherein the hollow preform has a variable thickness in a direction corresponding to a vehicle width direction.

6. The method of claim 5, wherein the hollow preform includes a center portion and end portions, the thickness of the center portion being larger than the thickness of the end portions.

7. The method of claim 1, wherein the hollow preform has a variable thickness in a radial direction.

8. The method of claim 1, wherein the inflatable mandrel is inflated using room temperature, heated gas, heated water, or heated oil.

9. The method of claim 1, wherein an outermost layer of the hollow preform includes adhesive materials.

10. A bumper assembly for a vehicle comprising:
    a bumper beam having a tubular portion extending in a vehicle width direction, the bumper beam having a metal section and a composite section, wherein
    the metal section and the composite section are coaxial, the composite portion being along an inner surface of the metal section,
    the composite section is fabricated using an inflatable mandrel such as to press an outer surface of a composite preform with the inner surface of the metal section, and
    the metal section and the composite section each having a hollow middle, the hollow middle of the composite section formed by the inflatable mandrel.

* * * * *